United States Patent
Demit et al.

(10) Patent No.: US 7,073,784 B2
(45) Date of Patent: Jul. 11, 2006

(54) MODULAR STRUCTURE FOR MAINTAINING A BODY PART

(75) Inventors: Daniel Demit, Courbevoie (FR); Francois Malatier, Taverny (FR)

(73) Assignee: ABB MC, Saint-Quen l'Aumone (FR)

( * ) Notice: Subject to any disclaimer, the term of this patent is extended or adjusted under 35 U.S.C. 154(b) by 0 days.

(21) Appl. No.: 10/499,639

(22) PCT Filed: Dec. 12, 2002

(86) PCT No.: PCT/FR02/04340

§ 371 (c)(1),
(2), (4) Date: Jun. 21, 2004

(87) PCT Pub. No.: WO03/053629

PCT Pub. Date: Jul. 3, 2003

(65) Prior Publication Data

US 2005/0183378 A1 Aug. 25, 2005

(30) Foreign Application Priority Data

Dec. 21, 2001 (FR) .................................. 01 16693

(51) Int. Cl.
*B25B 5/14* (2006.01)

(52) U.S. Cl. ...................................... 269/104; 269/234
(58) Field of Classification Search ............... 52/653.2, 52/646, 648.1; 269/104, 234, 228, 287; 254/104
See application file for complete search history.

(56) References Cited

U.S. PATENT DOCUMENTS

| 3,510,118 A | 5/1970 | Brechtel |
| 4,142,343 A * | 3/1979 | Trafton ...................... 52/736.2 |
| 5,409,158 A | 4/1995 | Angel |

FOREIGN PATENT DOCUMENTS

DE 79 27 493 1/1980

* cited by examiner

*Primary Examiner*—Naoko Slack
(74) *Attorney, Agent, or Firm*—Young & Thompson (57) ABSTRACT

The invention concerns a structure for maintaining a body part, the structure consisting of assembled frame members, at least one of the frame members being a tubular beam (1) provided on the outside with at least a groove (7) extending longitudinally. The invention also concerns a template for drilling said beam.

18 Claims, 5 Drawing Sheets

FIG_1

FIG. 2

FIG_3

FIG_4

FIG_5

FIG_6

FIG_7

FIG_8

MODULAR STRUCTURE FOR MAINTAINING A BODY PART

The present invention relates to a structure for holding bodywork parts.

BACKGROUND OF THE INVENTION

In car bodywork assembly lines, subassemblies (such as the subframe, the sides of the body, the rear skirt, . . . ) are positioned relative to one another and relative to welding robots. By their very nature, bodywork parts are deformable on being subjected to stresses, so the tooling used for making bodywork of determined and reproducible shape performs two functions: firstly it constitutes framework for each deformable subassembly for the purpose of stiffening it to enable it to be handled by the handling robots, and secondly it constitutes a stable interface enabling positioning to be precise in a fixed frame of reference associated with the welding robots.

Such tools are generally constituted by a structure for holding a bodywork part, which structure comprises members assembled to one another together with auxiliary elements secured to the members for the purposes, for example, of positioning the part in the structure, of holding the part in the structure, of positioning the structure relative to another structure, of making a connection with the handling robot, . . . .

These members are formed by beams made from metal bars of lengths that are determined as a function of the dimensions of the part to be held. With the bars used, it is difficult to have beams that are sufficiently rigid and lightweight for this purpose.

The beams are usually assembled to one another and to the auxiliary elements by welding. This means that they are relatively time-consuming and difficult to make, given the deformations caused by welding, and their fabrication also requires specialized personnel. Furthermore, repairs and additions of auxiliary elements need to be performed by the specialized personnel and with very great care so as to avoid spoiling the shape of the structure. In order to limit deformation, it is common practice to make use of beams and of auxiliary elements of considerable thickness, to the detriment of lightness.

It is also possible to make an assembly by bolting. However it is difficult to position the various beams and auxiliary elements relative to one another prior to assembling them together. An assembly made in this way is generally not sufficiently rigid. Furthermore the beams must be of relatively great thickness in order to allow fixing screws to penetrate sufficiently, and as a result the beams are relatively heavy.

However, tool weight is an important parameter governing the dimensions of the robots that are to handle the tools, and having an influence on the cost of such robots.

OBJECTS OF SUMMARY OF THE INVENTION

According to the invention, a holding structure is provided that is made up of assembled-together members, with at least one of the members being a tubular beam provided on the outside with at least one longitudinally-extending spline.

Thus, the spline can be used as means for stiffening the beam in bending, as an angular positioning marker for an element fixed on the beam, as means for preventing an element fixed on the beam from moving in rotation, and as a zone for anchoring a screw (the spline forming local extra thickness, and thus enabling a screw to be engaged over a depth that is sufficient, while still making it possible to conserve weight that is relatively low). It is thus possible to obtain a structure that is relatively lightweight, robust, and rigid, and that is easy to implement.

Preferably, the tubular beam has a plurality of splines that are angularly distributed in regular manner around the beam and that present a section that is substantially circular and symmetrical about at least one diameter thereof.

This increases the number of options for fixing and orienting beams and elements that are to be fixed thereon.

In a particular embodiment, at least one spline has at least one flank arranged to constitute an angular reference face.

It is then possible to obtain accurate positioning for elements that are to be fixed on the beam.

It is then advantageous for the structure to include at least one auxiliary element provided with means enabling it to be fixed to the beam, and for said means to include a face for bearing against the reference face and presser means for pressing the bearing face against the reference face, the bearing face preferably being formed by a side wall of a groove formed in the auxiliary element to receive the spline, and the presser means comprising at least one wedging device for being inserted between the flank of the spline opposite from the reference face and the facing side wall of the groove.

This ensures that the auxiliary element is positioned effectively and firmly relative to the beam.

Also advantageously, the wedging device comprises a chock and at least one sloping wedge disposed so that the slope of the wedge co-operates with the corresponding ramp on the chock and so that the chock and the wedge present parallel opposite faces, one for bearing against the flank of the spline opposite from the reference face and the other for bearing against the side wall of the facing groove, the wedge being mounted to slide relative to the chock and the wedging device including means for adjusting the position of the wedge relative to the chock.

This method of pressing the bearing face against the reference face is then particularly simple and effective.

The invention also provides a template for drilling the beam, which template comprises a body provided with means for releasably fixing it on the beam, and with at least one drilling bushing arranged to extend over a spline of the beam when the template is in position on the beam, said means including a groove which is formed in the body and which possesses a first side wall forming a bearing face for pressing against a first flank of the spline, presser means for pressing the bearing face against the first flank, the presser means comprising a wedging device received between a second flank of the spline and a facing second side wall of the groove.

This enables holes to be drilled and tapped in a manner that is very accurate in each of the splines of the beam so as to make it possible subsequently to fix other beams and/or elements thereto.

BRIEF DESCRIPTION OF THE INVENTION

Other characteristics and advantages of the invention will appear on reading the following description of a particular, non-limiting embodiment of the invention.

Reference is made to the accompanying drawings, in which.

DETAILED DESCRIPTION OF THE INVENTION

The invention is described herein in an application to handling a bodywork part (not shown), e.g. in an assembly line for motor vehicle bodywork. In particular, the structure shown in FIGS. 1 to 4 is intended to constitute a lateral tool for manipulating a left-hand body side, said tool being arranged specifically to co-operate with a second lateral tool for manipulating a right-hand body side and with a rear tool for manipulating the rear skirt of the bodywork.

A complete holding structure may comprise a plurality of beams that are assembled to one another by means of auxiliary link elements fixed to the beams so as to hold them at predetermined angles and positions, and also fixed on the beams, auxiliary elements for positioning the bodywork part within the structure, auxiliary elements for holding the bodywork part as positioned in this way, auxiliary elements for fixing the structure to an arm of a handling robot, auxiliary elements for positioning the structure in the assembly line or relative to other structures, auxiliary elements for making releasable connections to said other structures, . . . . The holding structure is not shown in full in the figures, only one or a few beams and a few auxiliary elements appearing in the drawings so as to illustrate a few possible characteristic configurations.

With reference to FIGS. 1 to 4, the first holding structure of the invention comprises a beam given overall reference 1 and auxiliary elements referenced 2, 3, 4, 5, and 6.

Figure 1:
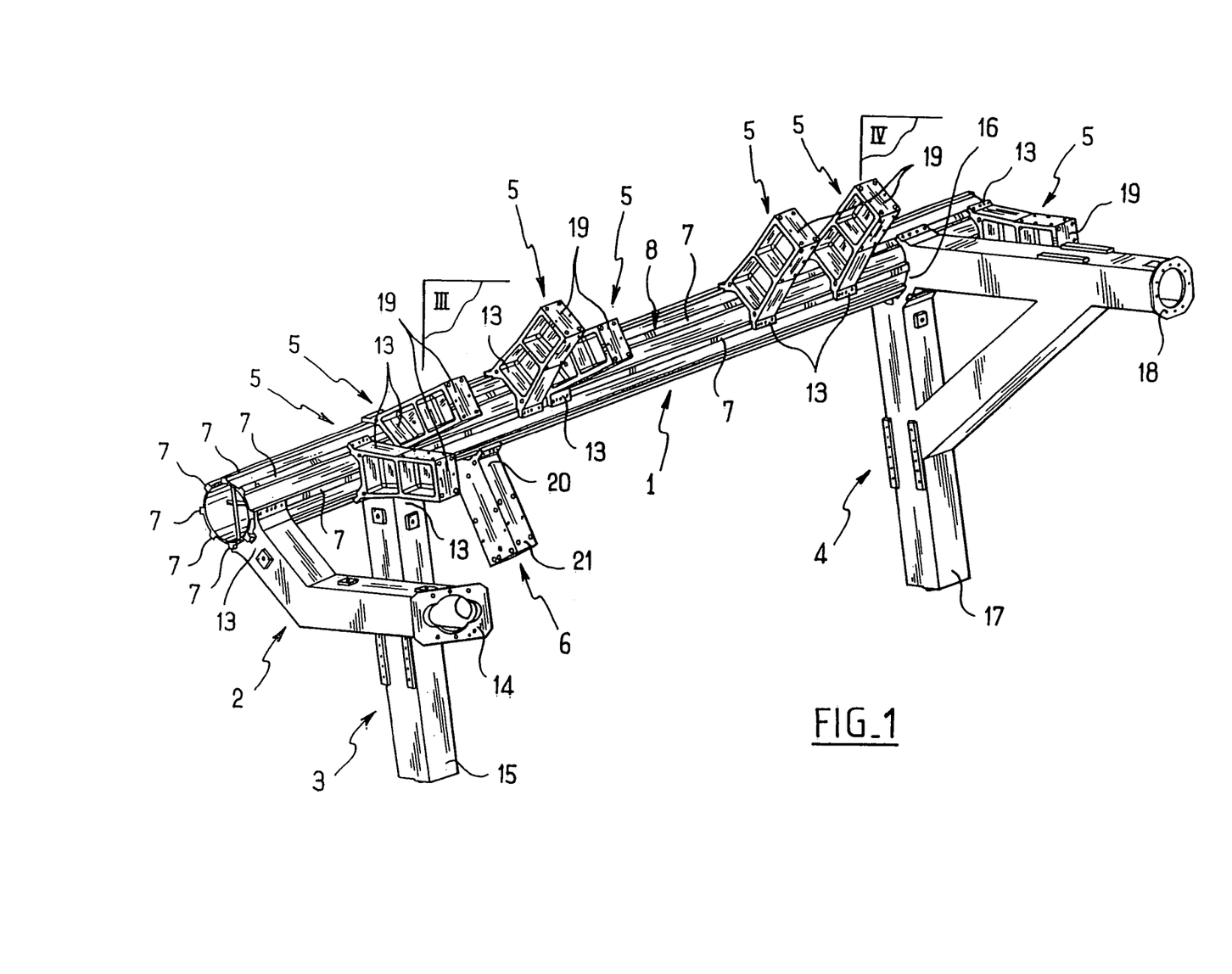
FIG. 1 is a fragmentary perspective view of a first structure in accordance with the invention.
Figure 2:
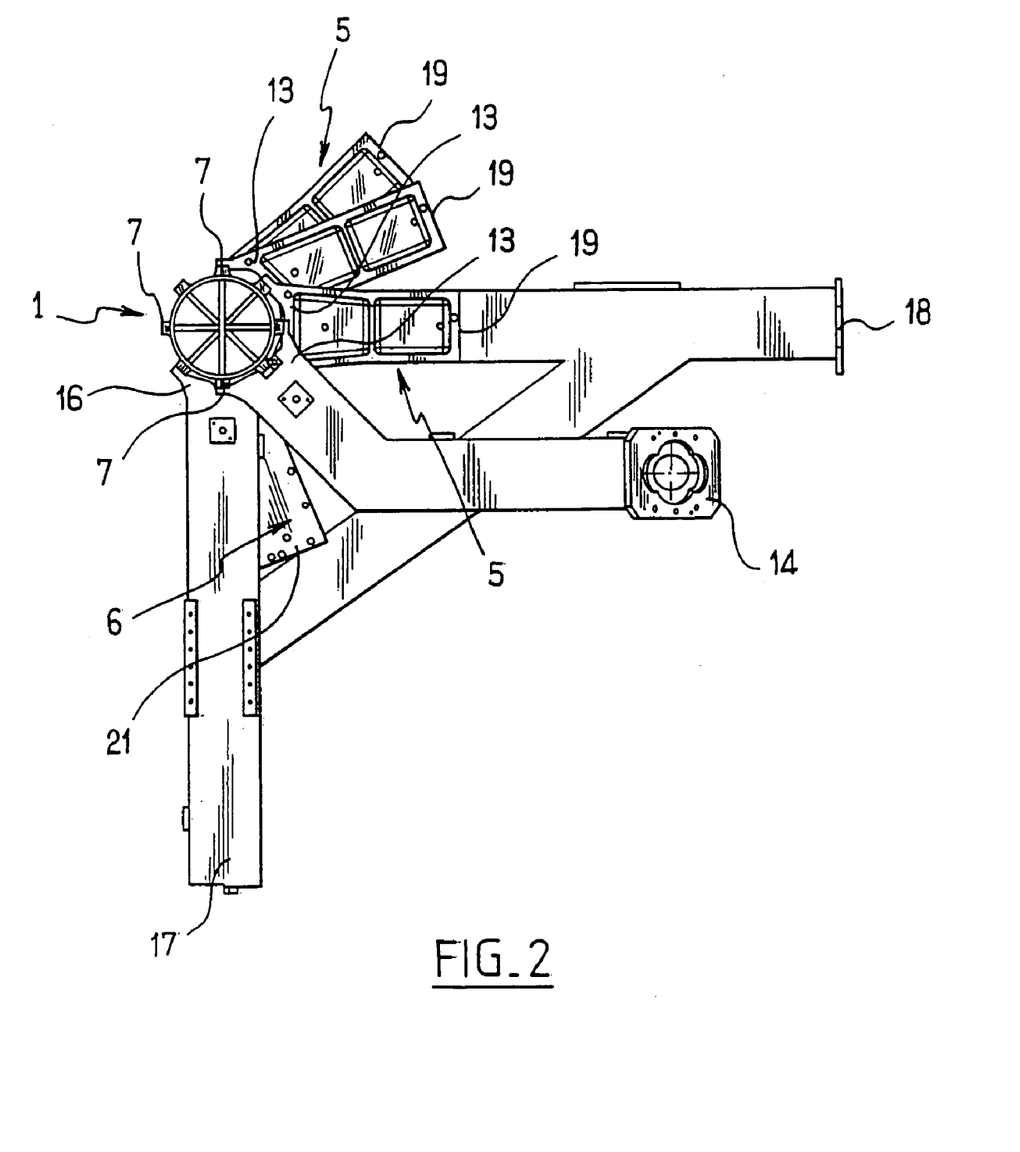
FIG. 2 is a side view of the structure.

The beam 1 is tubular, of circular section, and it is provided with splines 7 which extend along the outside surface 8 of the beam 1. In this case, the splines 7 are fitted onto the outside surface 8 of the beam 1 by welding, however the splines 7 could be made integrally with the beam 1, e.g. by extrusion. There are eight splines 7 and they are disposed at 45° intervals relative to one another. The beam 1 is thus symmetrical.

Each spline 7 has two substantially parallel flanks 9, 10 and a top face 11. Some of the splines, referenced 7' in order to distinguish them from the others, include a respective flank 9' that has been machined accurately so as to constitute a reference surface. It is possible for the beam 1 to have only a single spline 7'.

Tapped holes 12 (visible in FIGS. 3 and 4) and a hole for receiving a pin are made radially through the beam 1 from the top surfaces 11 of the splines 7.

The auxiliary element 2 has one end provided with means 13 (described below) enabling it to be releasably fixed on the beam 1, and an opposite end provided with a female V-shape 14 for co-operating with a male V-shape of the rear tool structure to ensure that these two structures are positioned relative to each other.

Each auxiliary element 5 has one end provided with means 13 for releasably fixing it to the beam 1, and an opposite end 19 arranged for fixing either positioning members and/or holding members for the bodywork part, or for positioning the structure. By way of example, these members can be clamping means, positioning or indexing fingers or studs, . . . .

The means 13 comprise a soleplate 22 for bearing against two splines 7 disposed at 90° from each other on either side of a spline 7'. The soleplate 22 has holes 23 that receive fixing screws 24 with transverse clearance, the screws being engaged in the tapped holes 12 in the splines 7, and a hole having a pin engaged therein (not shown in the figures) and received in the hole provided for this purpose in the splines. A groove 25 is formed in the soleplate 22 to receive the spline 7'. The groove 25 is defined laterally by walls 26, 27 that are spaced apart from each other by a distance that is greater than the distance between the flanks 9' and 10' of the spline 7'. The wall 27 is machined to form a reference surface for positioning the auxiliary element in co-operation with the flank 9'.

A wedging device given overall reference 28 is received between the flank 10' and the facing wall 26. The wedging device 28 (more clearly visible in FIG. 7, where it is shown mounted on the drilling template) comprises a chock 29 and two wedges 30. The chock 29 has a soleplate 31, and on its opposite side two ramps 32 disposed in such a manner that these surfaces form a triangle. Each wedge 30 comprises on the side a soleplate 33, and on the opposite side a slope 34, together with a heel 35 at the thick end of the wedge 30. The wedges 30 are disposed so that the slopes 34 co-operate with the corresponding ramps 32 and so that the soleplates 31, 33 bear firstly against the flank 10' and secondly against the facing wall 26, the heels 35 forming rims that extend over the ends of the facing chocks 29. A screw (not shown) is mounted to turn in each heel 35 and is engaged in a tapped hole formed in the corresponding end of the chock 29 so as to enable each wedge 30 to be caused to slide relative to the chock 29, thereby moving the soleplates 31, 33 further apart to a greater or lesser extent (the wedges 30 are thus adjustable in position relative to the chock 29). The wedging device thus enables the wall 27 to be pressed firmly against the flank 9'. The angular positioning of the auxiliary element is accurate and is maintained even when large forces are exerted on said element. Because of the clearance that exists between the soleplate 22 and the fixing screws 24, said screws do not oppose positioning of the element. The pin provides positioning in a direction parallel to the spline.

The auxiliary element 3 is a leg possessing one end fitted with means 13 enabling it to be releasably fixed to the beam 1 (said means being identical to those described above), and an opposite end 15 that is arranged to bear against the ground or to co-operate with another beam 1 via means that are not shown but that are of the same type as the means 13.

The auxiliary element 4 is a bracket whose top is provided with means 16 enabling it to be releasably fixed to the beam 1, whose first branch has a free end 17 arranged to bear on the ground or to co-operate with another beam 1 via means that are not shown but that are of the same type as the means 13, and a second branch with a free end 18 that is arranged to bear against and be fixed to a corresponding bracket secured to the structure of the righthand lateral tool.

The means 16 comprise a soleplate 36 extending over 180° to bear against three splines 7 disposed at 90° intervals to one another, with two of these splines 7 lying on either side of the spline 7'. The soleplate 36 includes holes 37 that receive fixing screws 24 with transverse clearance, said screws being engaged in the tapped holes 12 in the splines 7. A groove 38 is formed in the soleplate 36 to receive the spline 7'. The groove 38 is defined laterally by walls 39 and 40 that are spaced apart from each other by a distance that is greater than the distance between the flanks 9' and 10' of the spline 7', the wall 40 being machined to form a bearing surface pressed against the flank 9'.

A wedging device 28 identical to that described above is housed between the flank 10' and the facing wall 39.

The auxiliary element 6 has one end provided with means 20 for releasably fixing it to the beam 1, and an opposite end 21 arranged to be fixed either to members for positioning and/or holding the bodywork part, or to members for positioning the structure.

The means 20 comprise a soleplate 40 for bearing against the top faces 11 of two splines 7 that are at 90° from each other, a pin (not shown) that is inserted in the corresponding radial holes of the soleplate and the spline to serve mainly for positioning the auxiliary element longitudinally relative to the beam, and fixing screws 24 passing through the soleplate 40 and engaged in the tapped holes 12 of the splines 7. This element is not required to withstand large forces so there is no need to provide special means for holding it in position other than the fixing screws engaged in the tapped holes 12.

The structure made in this way is completely modular, the beams 1 and the auxiliary elements 2, 3, 4, 5, and 6, being easy to assemble and disassemble. In addition, the structure is rigid, relatively light in weight, and easy to repair, it being possible to change quickly any components that might become damaged.

Figures 3, 4:
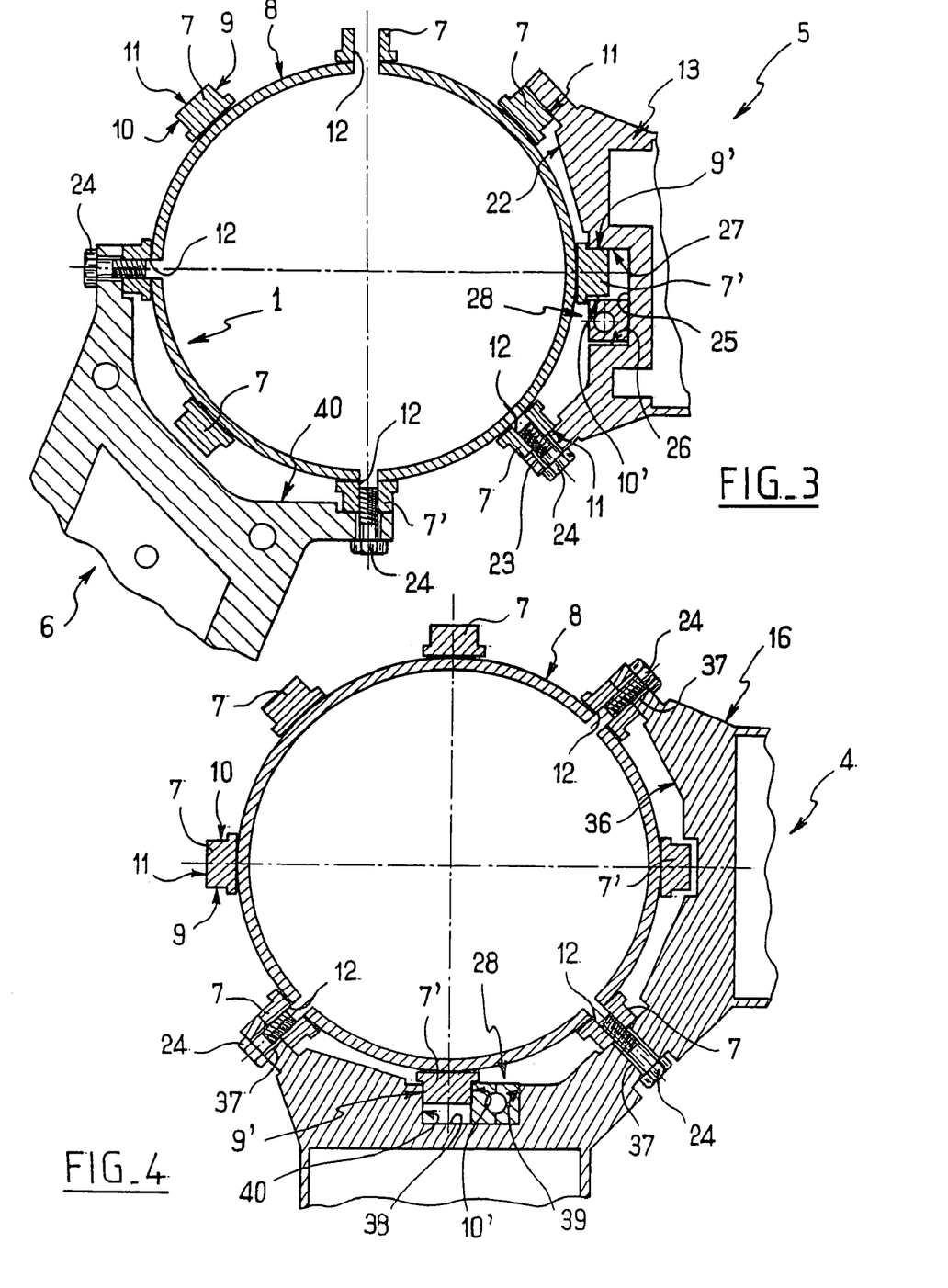
FIG. 3 is a section on plane III of FIG. 1.
FIG. 4 is a section on plane IV of FIG. 1.

It should be observed that when two auxiliary elements have respective soleplates that extend over less than 180° (i.e. which overlie no more than four splines), these two auxiliary elements can be located in the same plane extending transversely to the beam (see for example FIG. 3).

The holes made in the auxiliary elements 2, 3, 4, 5, or 6 are preferably all spaced apart by the same distance. This makes it easy to implant an auxiliary element between auxiliary elements that have already been mounted on the beam, and increases modularity.

Figure 5:
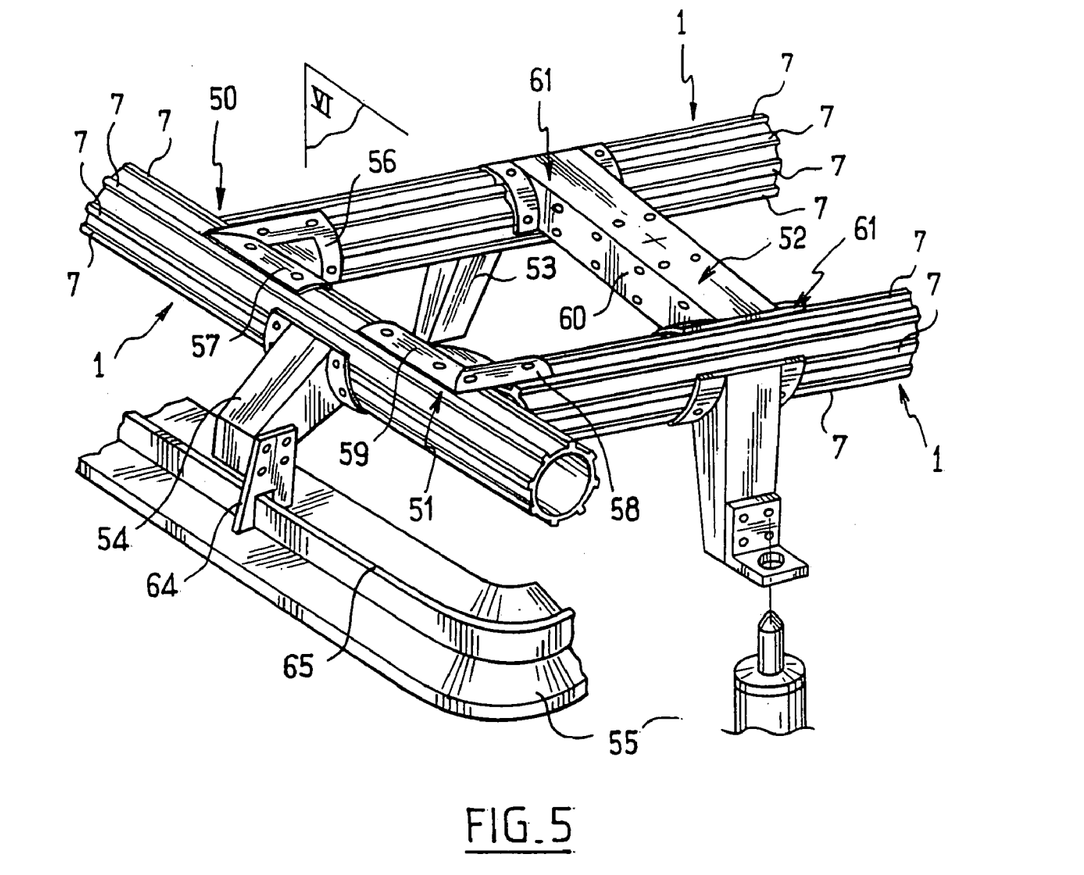
FIG. 5 is a fragmentary perspective view of a second structure in accordance with the invention.
Figure 6:
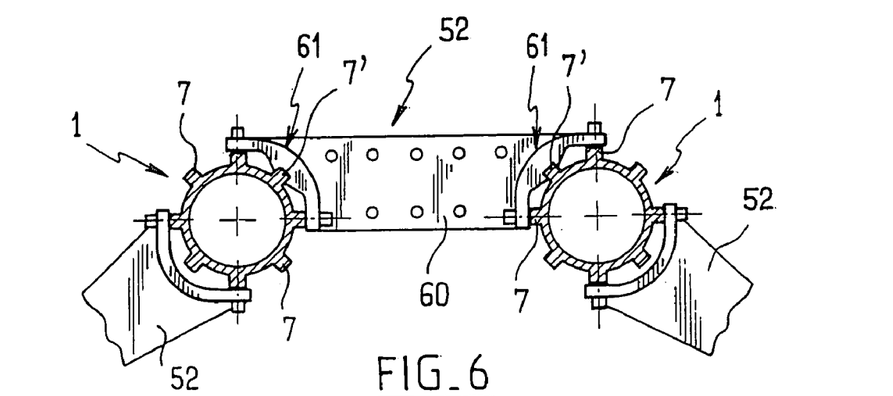
FIG. 6 is a fragmentary section view of said structure on plane VI of FIG. 5.

With reference to FIGS. 5 and 6, the second holding structure in accordance with the invention comprises three beams 1 that are entirely identical to the beam described above, auxiliary elements given overall references 50, 51, and 52 for interconnecting the beams 1 rigidly to one another, and auxiliary elements given overall references 53 and 54 for positioning the structure relative to a stand 55.

The auxiliary elements 50, 51 are arranged to fix two beams 1 to each other in such a manner that they form an angle of 90°. Each auxiliary element 50, 51 comprises two respective soleplates 56 & 57 and 58 & 59 for bearing against two splines 7 disposed at 90° relative to each other on either side of a spline 7' having a reference flank. The soleplate 56 & 57 and 58 & 59, and the associated fixing means are identical to the fixing means 13 and to the soleplate 12 as described above. The soleplates 56 & 57 and 58 & 59 extend in directions that form an angle of 90° relative to each other.

The auxiliary element 52 comprises an arm 60 provided at each end with means 61 for releasably fixing it to two beams 1 in order to hold them parallel to each other. The means 61 are identical to the fixing means 13.

The auxiliary elements 53 are identical to the auxiliary element 6 and each of them is fixed to one of the parallel beams 1 in the same manner as the auxiliary element 6. Each auxiliary element 53 has a free end provided with a housing 62 for receiving a pilot 63 secured to the stand 55. The auxiliary elements 52 and 53 extend substantially in the same plane extending transversely to the beam 1.

The auxiliary element 54 is identical to the auxiliary element 6 and is fixed to one of the beams 1 in the same way. The auxiliary element 64 has a free end provided with a fork 64 for sliding along a rail 65 secured to the stand 55.

Figure 7:
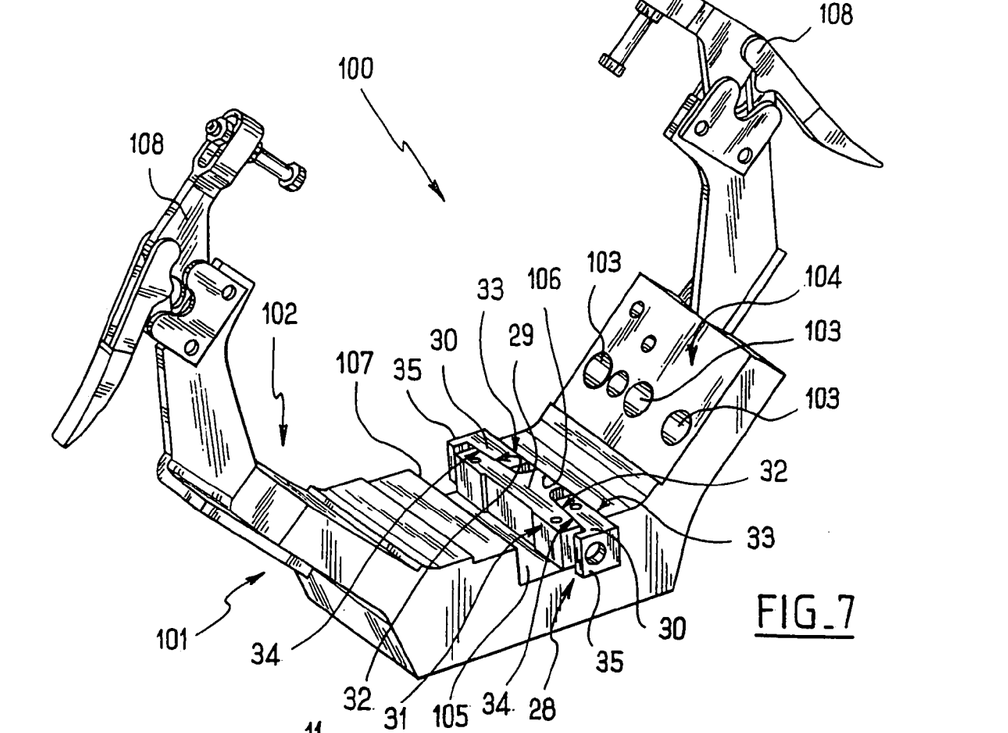
FIG. 7 is a perspective view of a template for drilling a beam of the FIG. 1 structure.
Figure 8:
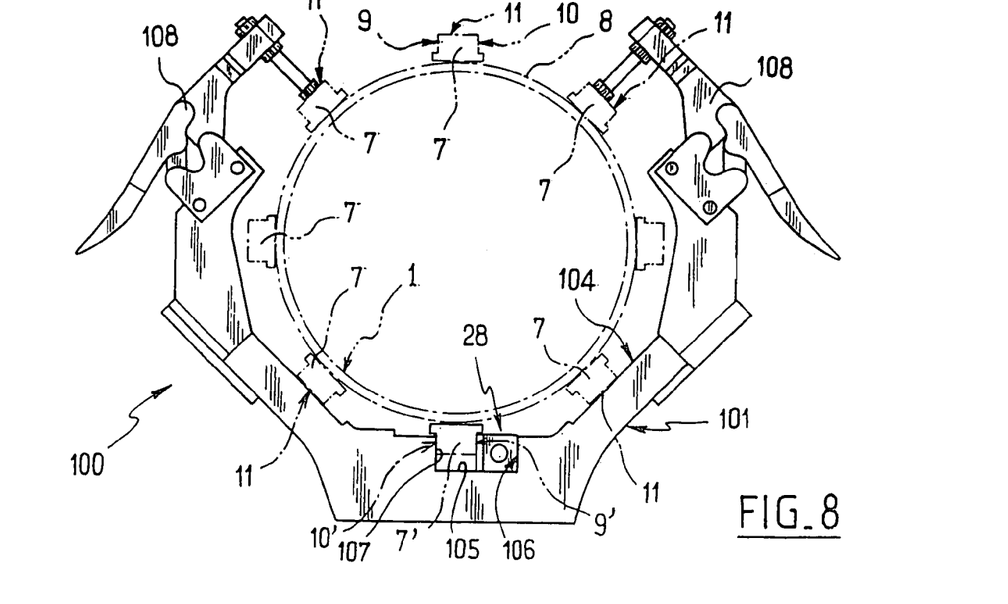
FIG. 8 is a section of the template in position on the beam.

The tapped holes 12 and the smooth hole for the pin are made in the splines 7 by means of a drilling template shown in FIGS. 7 and 8, and given overall reference 100 in these figures.

The template 100 comprises a body 101 provided with means 102 enabling it to be releasably fixed on the beam 1, and drilling bushings 103 disposed to extend over a spline for drilling when the template is in position on the beam 1.

The means 102 comprise a soleplate 104 for bearing against the top faces 11 of two splines 7 for drilling that are disposed at 90° from each other on either side of another spline 7 used or positioning the template 100. A groove 105 is formed in the soleplate 104 to receive said spline 7. The groove 105 is defined laterally by walls 106 and 107 that are spaced apart by a distance that is greater than the distance between the flanks 9 and 10 of the spline 7. The wall 107 is machined to form a reference surface for angularly positioning the auxiliary element 2 in co-operation with the flank 9 of the spline 7 used for positioning. A wedging device 28 identical to those described above is received between the flank 10 and the facing wall 106.

The means 102 further comprise clamping means 108 of the "grasshopper" type for bearing against the top faces 11 of two splines 7 opposite from the splines 7 that are to be drilled so as to press the soleplate 104 against the top faces 11 of the two splines 7 that are to be drilled. Other clamping means could be used.

The template 100 is put into place on a spline 7 and is positioned along it by using positioning means. The positioning means may be constituted merely by measuring a distance from a predetermined reference point on the beam or by using a longitudinal positioning template.

When the template 100 is in position, the drilling bushings 103 extend over the splines 7 for drilling.

The template 100 may be arranged to enable more than two splines 7 to be drilled, and may optionally be made in two parts so as to enable all of the splines to be drilled.

It should be observed that the retaining spline for positioning the template 100 on the beam 1 is preferably a spline 7' so as to make use of the flank 9' thereof in order to ensure accurate positioning of the template. Drilling bushings may also be provided for drilling the spline(s) used for positioning.

Naturally, the invention is not limited to the embodiments described above, but on the contrary it covers any variant using equivalent means to reproduce the essential characteristics specified above.

In particular, the number of splines and the way in which they are arranged can be different from those shown, the beam 1 need not be symmetrical, or it may be symmetrical about only one of its diameters.

In addition, means other than the described wedging device could be used for pressing the reference wall of the groove against the reference flank 9' of the spline 7', for example a clamping device using an eccentric.

Furthermore, the beam 1 may have a plurality of splines 7' each with a respective flank 9' arranged to form a positioning reference.

Clamping means, e.g. analogous to those of the template 100, may also be used for fixing auxiliary elements to the beams. The auxiliary elements could also bear against one spline only.

The invention claimed is:

1. A structure for holding a bodywork part, the structure being made up of assembled-together members, wherein at least one of the members is a tubular beam (1) provided on the outside with at least one spline (7) extending longitudinally and including at least one reference flank (9') arranged to constitute a positioning reference for at least one auxiliary element (2, 3, 4, 5) having a soleplate (22, 36) provided with means (13, 16, 24) for fixing it to the beam, said means including a bearing face (27, 40) for pressing against the reference flank (9') and presser means (28), bearing on another flank (10') of the spline (7') that is opposite from the reference flank (9'), for pressing the bearing face against the reference flank, wherein the bearing face is formed by a side wall (27, 40) of a groove (25, 38) formed in the auxiliary element (2, 3, 4, 5) for receiving the spline, and wherein the presser means comprise at least one wedging device (28) for inserting between the another flank (10') of the spline (7') that is opposite from the reference flank (9') and the facing side wall (26, 39) of the groove (27, 40).

2. A structure according to claim 1, wherein the beam (1) has a plurality of splines (7) that are angularly distributed regularly around the beam.

3. A structure according to claim 2, wherein the beam (1) presents a section that is substantially circular and symmetrical about at least one diametral axis thereof.

4. A structure according to claim 1, wherein the wedging device (28) comprises a chock (29) and at least one sloping wedge (30) disposed so that the slope (34) of the wedge co-operates with a corresponding ramp (32) of the chock, and wherein the chock and the wedge present two parallel opposite faces (31, 33) for bearing one against the another flank (10') of the spline (7') opposite from the reference flank (9') and the other for bearing against the facing side wall (26, 39) of the groove (25, 38), the wedge being mounted to slide relative to the chock and the wedging device including means for adjusting the position of the wedge relative to the chock.

5. A structure according to claim 1, wherein the fixing means include at least one screw (24) for engaging in a tapped hole (12) formed in the spline (7) in a radial direction of the beam.

6. A structure according to claim 1, wherein the beam (1) has a plurality of splines (7), and the soleplate (22, 36, 40) of the auxiliary element bears against at least two splines.

7. A structure according to claim 6, wherein the soleplate (22, 36, 40) extends over an angle of no more than 180°.

8. A structure according to claim 1, wherein the auxiliary element is arranged to connect two beams (1) together at a predetermined angle.

9. A drilling template (100) for a beam (1) provided on the outside with at least one spline (7) extending longitudinally and including at least one reference flank (9') arranged to constitute a positioning reference for at least one auxiliary element (2, 3, 4, 5) having a soleplate (22, 36) provided with means (13, 16, 24) for fixing it to the beam, said means including a bearing face (27, 40) for pressing against the reference flank (9') and presser means (28) bearing on another flank (10') of the spline (7') that is opposite from the reference flank (9') for pressing the bearing face against the reference flank, the template comprising a body (101) provided with means (100, 104) for releasably fixing it on the beam, and with at least one drilling bushing (103) arranged to extend over a spline (7) of the beam (1) when the template is in position on the beam, and wherein said means include a groove (105) which is formed in the body and which possesses a first side wall (107) forming a bearing face for pressing against a reference flank (9) of the spline (7), presser means for pressing the bearing face against the reference flank, the presser means comprising a wedging device received between a second flank (10) of the spline and a facing second side wall (106) of the groove.

10. A template according to claim 9, wherein the wedging device comprises a chock (29) and at least one sloped wedge (30) disposed so that the slope (34) of the wedge co-operates with a corresponding ramp (32) of the chock, and so that the chock and the wedge present two parallel opposite faces (31, 33) for bearing one against the second flank (10) of the spline (7) and the other against the second side wall (106) of the groove (105), the wedge being mounted to slide relative to the chock, and the wedging member including means for adjusting the position of the wedge relative to the chock.

11. A structure for holding a bodywork part, the structure being made up of assembled-together members, wherein at least one of the members is a tubular beam (1) provided on the outside with at least one spline (7) extending longitudinally and including at least a first flank (9') arranged to constitute a positioning reference flank (9') for at least one auxiliary element (2, 3, 4, 5) having a soleplate (22, 36) provided with means (13, 16, 24) for fixing it to the beam, said means including a bearing face (27, 40) for pressing against the reference flank (9') and presser means (28) for pressing the bearing face against the reference flank (9'), wherein the bearing face is formed by a side wall (27, 40) of a groove (25, 38) formed in the auxiliary element (2, 3, 4, 5) for receiving the spline, and wherein the presser means comprise at least one wedging device (28) for inserting between a second flank (10') of the spline (7') that is opposite from the reference flank (9') and the facing side wall (26, 39) of the groove (27, 40).

12. A structure according to claim 11, wherein the beam (1) has a plurality of splines (7) that are angularly distributed regularly around the beam.

13. A structure according to claim 11, wherein the beam (1) presents a section that is substantially circular and symmetrical about at least one diametral axis thereof.

14. A structure according to claim 11, wherein the wedging device (28) comprises a chock (29) and at least one sloping wedge (30) disposed so that the slope (34) of the wedge co-operates with a corresponding ramp (32) of the chock, and wherein the chock and the wedge present two parallel opposite faces (31, 33) for bearing one against the second flank (10') of the spline (7') opposite from the reference flank (9') and the other for bearing against the facing side wall (26, 39) of the groove (25, 38), the wedge being mounted to slide relative to the chock and the wedging device including means for adjusting the position of the wedge relative to the chock.

15. A structure according to claim 11, wherein the fixing means include at least one screw (24) for engaging in a tapped hole (12) formed in the spline (7) in a radial direction of the beam.

16. A structure according to claim 15, wherein the soleplate (22, 36, 40) extends over an angle of no more than 180°.

17. A structure according to claim 11, wherein the beam (1) has a plurality of splines (7), and the soleplate (22, 36, 40) of the auxiliary element bears against at least two splines.

18. A structure for holding a bodywork part, the structure being made up of assembled together members, wherein at least one of the members is a tubular beam (1) provided on the outside with at least one spline (7) extending longitudinally and including at least a first flank (9') arranged to constitute a positioning reference flank (9') for at least one auxiliary element (2, 3, 4, 5) having a soleplate (22, 36) provided with means (13, 16, 24) for fixing it to the beam, said means including a bearing face (27, 40) for pressing against the reference flank (9') and presser means (28) for pressing the bearing face against the reference flank (9'), wherein the auxiliary element is arranged to connect two beams (1) together at a predetermined angle.

* * * * *